(12) United States Patent
Liu et al.

(10) Patent No.: US 10,812,437 B1
(45) Date of Patent: Oct. 20, 2020

(54) RANKING ITEMS USING A UNIFIED MODEL

(71) Applicant: Facebook, Inc., Menlo Park, CA (US)

(72) Inventors: Xiangyang Liu, Redwood City, CA (US); Lu Zhang, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 109 days.

(21) Appl. No.: 15/943,639

(22) Filed: Apr. 2, 2018

(51) Int. Cl.
   *H04L 12/58* (2006.01)
   *G06N 20/00* (2019.01)

(52) U.S. Cl.
   CPC ............ *H04L 51/26* (2013.01); *G06N 20/00* (2019.01); *H04L 51/043* (2013.01); *H04L 51/32* (2013.01)

(58) Field of Classification Search
   CPC ........ G06N 20/00; G06Q 10/00; G06Q 50/01; H04L 51/26; H04L 51/32; H04L 51/043
   See application file for complete search history.

(56) References Cited

U.S. PATENT DOCUMENTS

| | | | | |
|---|---|---|---|---|
| 2004/0205134 A1* | 10/2004 | Digate | ................... | G06Q 10/10 709/206 |
| 2008/0243789 A1* | 10/2008 | Kussmaul | .............. | G06Q 10/00 |
| 2015/0278221 A1* | 10/2015 | Perry, III | ............... | G06Q 50/01 707/748 |

* cited by examiner

*Primary Examiner* — Nicholas R Taylor
*Assistant Examiner* — Michael Li
(74) *Attorney, Agent, or Firm* — Fenwick & West LLP

(57) ABSTRACT

A messaging system receives a contact list from a client device. The messaging system receives information about ephemeral content associated with contacts in the contact list and information about the active now status of contacts in the contact list. Based at least in part on the ephemeral content information and the active now status of the contacts in the contact list, the messaging system generates scores for contacts in the contact list using a unified scoring model. The unified scoring model receives as input information about multiple features associated with the user of the messaging system and the contact in the contact list and generates a score representing a probability that the user will interact with the contact upon being presented with the contact. The messaging system ranks the contacts in the list based on the generated scores and transmits the contact list to the client device for display in an activity unit.

17 Claims, 6 Drawing Sheets

RANKING ITEMS USING A UNIFIED MODEL

BACKGROUND

This disclosure relates generally to electronic messaging, and more particularly to controlling how information is presented by an electronic messaging application.

Dedicated messaging applications are a common method of online communication. Users use client devices, such as smartphones, to execute the messaging applications in order to exchange messages with other users. The messaging applications use the displays of the client devices to present information about the messaging applications to the users. For example, a messaging application may present information to one user about other users of the messaging applications.

Client devices, however, tend to have relatively small displays. The amount of information that can be presented on such displays is limited. Many client devices use touch screen interfaces and user interface elements in such interfaces are typically sized to allow users to select the elements with their fingers. The size of these elements limits the number of UI elements that can be displayed simultaneously. Moreover, a messaging application may simultaneously show multiple types of information, limiting the amount of display space that can be allocated to each type of information. These limitations detract from the users' abilities to interact with the client devices and messaging applications executing thereon.

SUMMARY

The above and other issues are addressed by a messaging system that organizes and displays contacts in a user's contact list using a unified scoring model to promote contacts that a user is more likely to engage with. The unified scoring model identifies elements associated with contacts that increase the probability of a user engaging the contact such as the contact being active now on the messaging application or the contact having associated ephemeral content.

The messaging system receives a contact list from a client device. The messaging system receives information about ephemeral content associated with the contacts in the contact list and active now status of the contacts in the contact list. The messaging system applies the unified scoring model to generate scores for contacts in the contact list, based at least in part on whether a contact has associated ephemeral contact and is currently active on the messaging system. The unified scoring model is trained based on features associated with the user and the contacts in the contact list, such as the frequency with which the user engages with the contact in the contact list upon being presented with the contact as currently active or as having ephemeral content. Based on the generated scores, the messaging system ranks contacts in the contact list.

The messaging system then transmits the ranked contact list to the client device. The client device displays the ranked contact list to the user of the client device. The ranked contact list may be displayed in association with indicators of the active now status and the ephemeral content associated with contacts in the contact list. The ranked contact list is periodically updated to reflect changes in the currently active users, in ephemeral content associated with the users, or in scores associated with contacts in the contact list.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
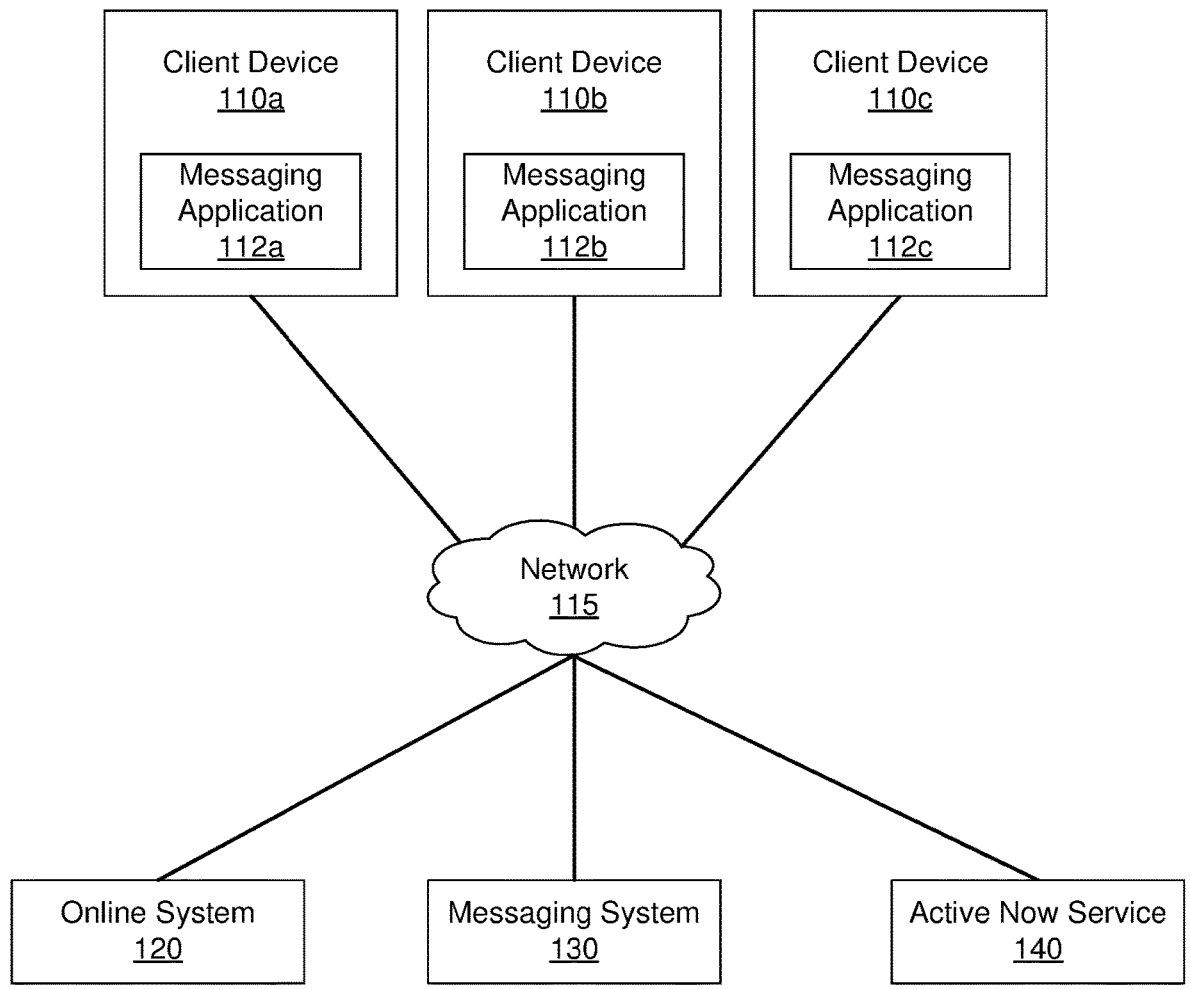
FIG. 1 is a block diagram of a system environment including an electronic messaging system, in accordance with an embodiment.

FIG. 1 is a block diagram of a system environment 100 for a messaging system 130 according to one embodiment. The system environment 100 shown by FIG. 1 comprises one or more client devices 110 connected to the messaging system 130 via a network 115. Each client device 110 contains a messaging application 112. An online system 120, such as a social networking system, and an Active Now service 140 are also connected to the network 115. While only a few client devices 110 and one messaging system 130 are shown in FIG. 1, embodiments of the environment 100 can have many such entities connected to the network 115. In alternative configurations, different and/or additional components may be included in the system environment 100.

FIG. 1 uses like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*," "110*b*," and/or "110*c*" in the figures.

A client device 110 is a computing device that can transmit and/or receive data via the network 115. A user may use the client 110 device to perform functions such as exchanging messages using the messaging system 130, interacting with the online system 120, browsing websites on web servers on the network 115, consuming digital content received via the network, and executing software applications. For example, the client device 110 may be a smartphone or a tablet, notebook, or desktop computer. In addition, the client device 110 may be an Internet-of-Things (IoT)-connected device such as a home appliance. The client device 110 may include a display device on which the user may view digital content, such as messages received from the messaging system 130.

The client device 110 may execute one or more applications ("apps") that extend the functionality of the client device. The apps may include a web browser that allows the client device 110 to interact with websites provided by servers connected to the network 115. The apps may also include one or more dedicated apps for accessing the online system 120 and/or the messaging system 130. In one embodiment, the user downloads and installs apps on the client device 110 for specific purposes, such as exchanging messages using the messaging system 130. Alternatively, the functionality of an app may be incorporated into an operating system of the client device 110 or included in other native functionality of the client device.

The messaging application 112 illustrated within the client device 110 in FIG. 1 represents an application for interacting with the messaging system 130 via the network 115. The messaging application 112 enables a user of the client device 110 to exchange messages with other client device users. The messaging application 112 maintains a list of contacts on behalf of the user. The contact list includes contact information about other client device users with whom the user can use the messaging system 130 to communicate. The contact information may include, for example, names, electronic and physical addresses, telephone numbers, pictures, and notes.

The messaging application 112 shows an activity unit on the display of the client device 110. The activity unit is a portion of a graphical user interface (GUI) of the messaging application 112 showing information describing activity of other users of the messaging application. The other users may be contacts of the client device user. For example, the activity unit may identify contacts who are currently using the messaging system 130. The activity unit may also identify contacts who have posted ephemeral content to the messaging system 130.

The messaging application 112 may display the activity unit in a variety of ways. For example, the activity unit may appear in a dedicated area of the GUI showing icons representing contacts and/or content posted by contacts. In one embodiment, different icons in the activity unit represent different types of activity by the contacts. For example, distinct icons in the activity unit may be presented for contacts that are currently active, and for representing ephemeral content available from the contacts. The activity unit may also be integrated into a general purpose contact list, such as by using formatting such as green checkmarks or other icons adjacent to contacts in the list to describe activity by the respective contacts.

Typically, the number of active contacts exceeds the amount of space available in the activity unit to show icons representing the activity of those contacts. The activity unit may be scrollable or otherwise navigable to allow the user to review the entire list of active contacts. Requiring the user to scroll or otherwise delve deeper into the activity unit in order to discover active contacts is burdensome and hinders usage of the messaging application 112.

Accordingly, an embodiment of the messaging application 112 receives a ranked list of active contacts from the messaging system 130. The messaging application 112 displays the contacts in this list in the activity unit in the ranking order. The highest-ranked contacts are listed first, such that these are the contacts visible in the activity unit without requiring the user to navigate through other users in the list. Displaying the active contacts in this way allows the user to use the messaging application 112 more effectively.

The online system 120 supports interactions among users of the client devices 110. The online system 120 is remote from the client devices 110 and may be implemented using one or more dedicated computers and/or a cloud computing platform. These interactions may include exchanging and viewing content, ecommerce transactions, and messaging. The content provided by the online system 120 includes pages associated with users. A page provides information about users, including demographic information such as age, location, occupation, education, gender, relationship status, and others. The online system may also store information on a user's relationships with other users of the online system in the form of a list of friends and family. The online system 120 additionally may allow users to upload content to be viewed and interacted with by other users of the online system. In one embodiment, users may upload ephemeral content that is displayed to other users of the online system for a limited amount of time, such as for a day. This information can be transmitted via the network 115.

The active now service 140 receives and stores data from the online system 120, messaging system 130, and/or messaging applications 112 indicating which users are currently using the respective system and/or application. The active now service 140 uses these data to maintain records identifying which users are active now (i.e., currently active). The active now service 140 provides indications of which contacts are active now to the messaging system 130 and/or the messaging applications 112. In one embodiment, the active now service 140 is remote from the client devices 110 and implemented using one or more dedicated computers and/or a cloud computing platform. The active now service 140 may also be integrated into another system, such as the online 120 or messaging 130 system.

In one embodiment, the active now service 140 receives activity notifications from the online system 120 indicating that particular users are currently using the online system to perform activities such as clicking through pages or links on the interface, interacting with other users or content generated by other users, uploading images or text to the systems, scrolling through a feed generated by the system, etc. The active now service 140 may also receive activity notifications from the messaging applications 112 and/or messaging system 130 indicating that particular users are using the system and/or application to compose or review messages from other users. Upon receiving an activity notification for a particular user, the active now service 140 records that user as being active. The active now service 140 may treat the user as being active for a limited time period, e.g., 5 minutes, after which the active now service 140 records the user as being inactive unless another activity notification for the user is received. In another embodiment, the active now service 140 may treat the user as being active until it receives notification indicating that the user has become inactive. Regardless, the active now service 140 uses the activity notifications to maintain records identifying which users are active now.

The active now service 140 sends indications of which users are active now to the messaging system 130. For example, a messaging system 130 can send a contact list to the active now service 140. Contemporaneously or later, the messaging system 130 can send a request for active now contacts to the active now service 140. The service 140 responds to the request by providing a response indicating which contacts are active now. In one embodiment, the active now service 140 sends the response as a delta list indicating the changes in active now status since the previous response sent to the messaging system 130.

The messaging system 130 interacts with the messaging applications 112 of the client devices 110 to support the exchange of electronic messages among the users of the devices. The messages can include text, images, external links, and other content. As with the online system 120, the messaging system 130 is remote from the client devices 110 and may be implemented using one or more dedicated computers and/or a cloud computing platform.

The messaging system 130 receives contact lists from the messaging applications 112. The messaging system 130 assigns scores to the contacts in the lists and ranks the contacts based at least in part on the scores. The factors used by the messaging system 130 to score and rank the contacts from a user may vary in different embodiments. In one embodiment, the contacts are scored and ranked by the likelihood that the user will interact with a contact upon seeing the contact listed in the activity unit. The user interactions may include sending a message to the contact and viewing ephemeral content posted by the contact.

The messaging system 130 uses a machine-learned scoring model to score contacts. An embodiment of the messaging system 130 uses a unified model trained using data sets containing different types of data having different features, such as data sets relating to user interactions involving messaging and relating to user interactions involving viewing ephemeral content. The scoring model uses pseudo-blending to combine the different features from the data sets. The trained scoring module can produce scores based on new instances of the features for which it was trained. As a result, the scoring module can be used to score a user's contacts based on likelihoods that the user will perform multiple types of interactions with the contacts (e.g., messaging and viewing ephemeral content). Therefore, the scores can be used to rank the contacts even though the underlying features for different contacts are different.

The network 115 comprises any combination of local area and/or wide area networks, using both wired and/or wireless communication systems. In one embodiment, the network 115 uses standard communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2:
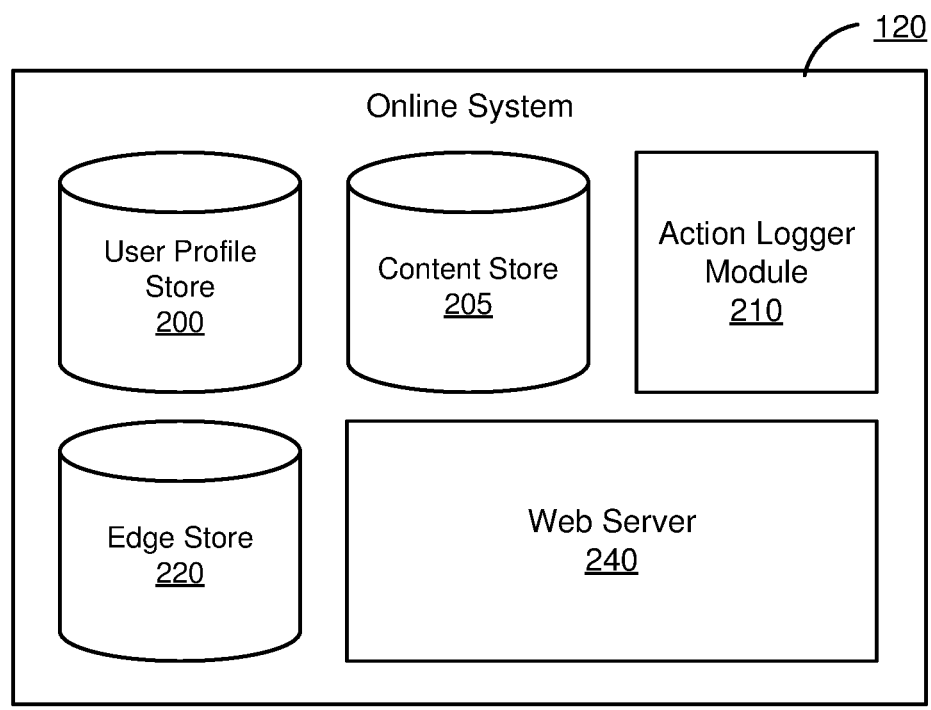
FIG. 2 is a block diagram of an architecture of the online system, in accordance with an embodiment.

FIG. 2 is a block diagram of an architecture of the online system 120 according to one embodiment. The online system 120 shown in FIG. 2 includes a user profile store 200, a content store 205, an action logger module 210, an edge store 220, and a web server 240. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 200. A user profile includes declarative information about the user that was explicitly shared by the user and may also include profile information inferred by the online system 120. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action logger module 210.

While user profiles in the user profile store 200 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system 120 using a brand page associated with the entity's user profile. Other users of the online system 120 may connect to the brand page to receive information posted to the brand page or to receive information from the brand page. A user profile associated with the brand page may include information about the entity itself, providing users with background or informational data about the entity.

The content store 205 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 205, such as status updates, photos tagged by users to be associated with other objects in the online system 120, events, groups or applications. In some embodiments, objects are received from third-party applications or third-party applications separate from the online system 120. In one embodiment, objects in the content store 205 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

In one embodiment, the content store 205 stores ephemeral content items posted by users or entities of the online system 120. In one example, ephemeral content includes photographs or videos representative of a user's day, called "day content." Ephemeral content items may be viewed in association with a user's profile on the online system 120, or may be viewed in association with the user on the messaging system 130 (via the messaging application 112). Ephemeral content items are associated with a time period (e.g., 24 hours), after which the content expires and is no longer available. Ephemeral content may be representative of the user's current location, actions, or interests. For example, a user may post a video clip of a meal at a restaurant as ephemeral content, indicating a temporary location and interest with which to engage other users of the online system 120.

The action logger module 210 receives communications about user actions internal to and/or external to the online system 120, populating an action log with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log.

In one embodiment, the edge store 220 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 220 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Multiple interactions between a user and a specific object may be stored as a single edge in the edge store 220, in one embodiment. Alternatively, each interaction between a user and a specific object is stored as a separate edge. In some embodiments, connections between users may be stored in the user profile store 200, or the user profile store 200 may access the edge store 220 to determine connections between users.

The web server 240 links the online system 120 via the network 115 to the one or more client devices 110, as well as to the one or more third party systems. The web server 240 serves web pages, as well as other content, such as JAVA®, FLASH®, XML and so forth. The web server 240 may receive and route messages between the online system 120 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 205. Additionally, the web server 240 may provide application programming interface (API) functionality to send data directly to native client device operating systems.

Figure 3:
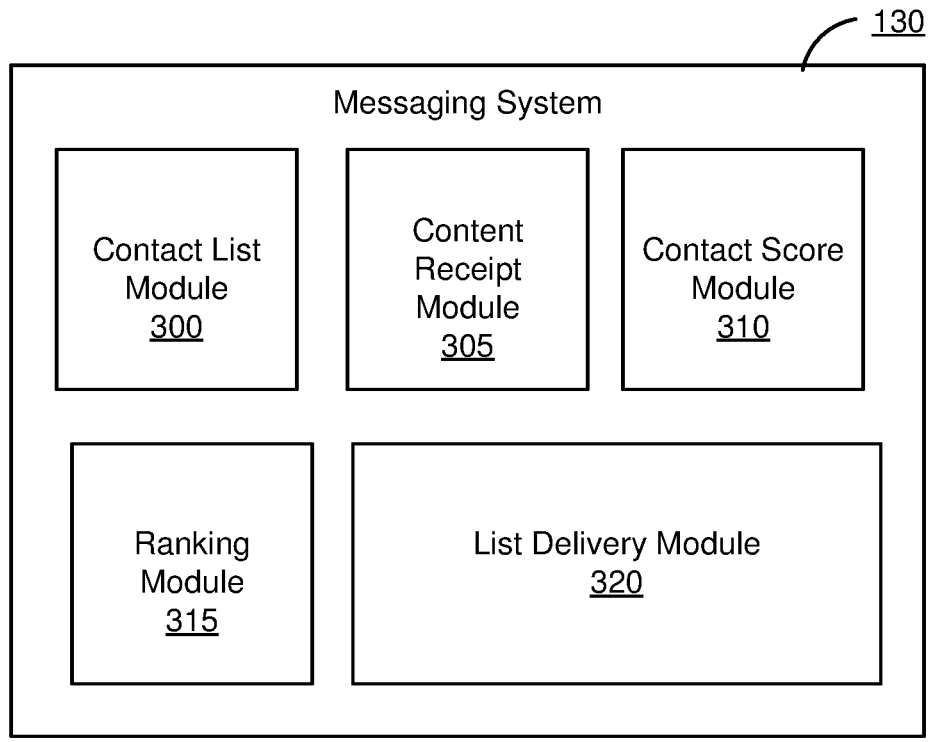
FIG. 3 is a block diagram of an architecture of the messaging system, in accordance with an embodiment.

FIG. 3 is a block diagram of an architecture of the messaging system 130 according to one embodiment. The messaging system 130 shown in FIG. 3 includes a contact list module 300, a content receipt module 305, a contact score module 310, a ranking module 315, and a list delivery module 320. In other embodiments, the messaging system 130 may include additional, fewer, or different modules. In addition, the functionality attributed to specific modules herein may be performed by other modules in other embodiments.

The contact list module 300 receives and stores contact lists from the messaging applications 112. In one embodiment, the contact list module 300 stores one or more contact lists for each client device user. Each contact list contains information associated with a set of contacts, where a contact is another user of the messaging application 112. For example, each contact in a contact list may include an identifier uniquely identifying a particular user of a messaging application 112, such as an email address, telephone number, or a user name for the online system 120. The contact lists received and stored by the contact list module 300 may include only a subset of the information maintained in the contact lists by the messaging application 112.

The content receipt module 305 receives information associated with contacts in a contact list from the online system 120 and the active now service 140. The information may indicate whether particular contacts are active now. The information may also indicate whether particular contacts have available ephemeral content. The content receipt module 305 may use this information to retrieve available ephemeral content from the online system 120.

The contact score module 310 generates scores for contacts in contact lists stored in the contact list module 300 based on the information received by the content receipt module 305. As mentioned above, a score for the contact indicates the likelihood that the user will interact with a contact upon seeing the contact listed in the activity unit.

An embodiment of the contact score module 310 uses a machine-learned scoring model to generate the scores. As part of the generation of the scoring model, the contact score module 310 forms a training dataset describing observed usage of the messaging system 130. The training dataset includes positive examples in which users were observed to interact with contacts that were displayed in the activity unit. The interactions may include sending messages to contacts that were displayed as active now and viewing ephemeral content posted by contacts. The training dataset may also include negative examples in which users were observed to not interact with contacts displayed in the activity unit.

The training dataset may include training data having different feature sets (e.g., by including examples in which contacts are both active now and have associated ephemeral content, in which contacts are active now but do not have associated ephemeral content, and/or in which contacts are not active now but do have associated ephemeral content). These different feature sets include different feature information (e.g., whether the user sent a message to a contact versus whether a user viewed ephemeral content from a contact). The training dataset may also include feature information describing the users and contacts. The feature information may include information retrieved from the online system 120, such as profile information describing biographic and demographic characteristics of users, logged actions describing user actions internal and/or external to the online system, and edge information describing connections between users and other objects on the online system.

In one embodiment, the training dataset is collected through the messaging application 112. Activity units are displayed to the users of the messaging application 112 that contain ordered icons for both active now contacts and contacts with associated ephemeral content. For example, the active now contacts and the contacts with ephemeral content may be ordered based on time since interaction with the messaging application 112 or content upload to the messaging application. Upon receiving interactions from the users of the messaging application 112 with the icons in the activity units, the contact score module 310 collects data describing the interactions. The collected data are used by the contact score module 310 as the training dataset for the combined model.

The contact score module 310 extracts values of features from the feature information in the training dataset, the features being variables deemed potentially relevant to the likelihood that the user will interact with a contact upon seeing that the contact listed in the activity unit. The features associated with active now information and features associated with ephemeral content are not directly comparable. For example, the features associated with active now information include the frequency with which the user of the messaging application 112 interacts with a given contact within a threshold time interval (e.g., within 1 day, within 7 days, within 30 days), the frequency with which the user of the messaging application interacts with contacts presented by the messaging application, and whether the contact is online. The features associated with ephemeral content include whether the user of the messaging application 112 has activated or blocked ephemeral content and the frequency with which the user interacts with ephemeral content. Shared features may additionally be associated with both active now information and ephemeral content, and include the frequency with which the user or the contact are active on the messaging system 130 or the online system 120, and historic duration of time spent on the messaging system or the online system. Other features may also be associated with other information about the user or the contact, such as the frequency with which the user or the contact interact with other aspects of the messaging system 130 or the online system 120, as well as demographic or biographic information associated with the user and the contact.

In one embodiment, the training data is formed of user-target pairs. A user-target pair represents a user of the messaging application 112 and a target contact presented to the user via the activity unit of the messaging application. For example, a target may be a contact with associated ephemeral content presented to the user. Each user-target pair is associated with a list of features describing the amount of engagement between the user and the target, as described above, and a label describing the outcome of presenting the target to the user. For example, the label identifies whether the user engaged with the target contact upon being presented with the target in the activity unit. Additionally, training data associated with a given user-target pair may not include data on both ephemeral content and active now information.

The contact score module 310 uses pseudo-blending to combine the features of active now information and ephemeral content information. The unified scoring model receives data sets with various types of data having different features relevant to generating a score for the contact associated with the data. In one embodiment, the contact score module 310 may generate multiple scores representing various types of data. The various types of data may be associated with different intents, where each intent is represented by a set of features and receives from the contact score module 310 a probability of engagement or interaction by the user of the messaging application 112. For example, an intent associated with active now information may identify engagement as initiating a conversation over the messaging application 112 with an active now contact. In another example, an intent associated with ephemeral content may identify engagement as interacting with the ephemeral content, even if the user does not initiate a conversation with the contact after interacting with the ephemeral content. The contact score module 310 identifies weights for the different intents. In one embodiment, the contact score module 310 may boost the weights associated with features of the messaging application 112 to encourage engagement. For example, the contact score module 310 may boost for ephemeral content features to encourage users of the messaging system 130 to interact with ephemeral content. In other examples, the contact score module 310 may boost other features or intents.

Intents associated with active now information and ephemeral content are represented at least in part by a set of shared features, as described above. The unified scoring model can accordingly be trained using training data associated with only active now information or only ephemeral content. Additionally, the contact score module 310 may boost the weights associated with shared features to improve the performance of both active now information and ephemeral content.

The contact score module 310 applies supervised machine learning to values of the features to train the unified scoring model. Once trained, the unified scoring model receives as input the identity of a user, the identity of a contact, and feature values (which may be retrieved or derived from feature information about the user and contact). For example, the unified scoring model receives information about ephemeral content associated with the contact, active now information associated with the contact, and other features for the contact. Based on the input identities and features, the unified scoring model produces as output a score representing the likelihood that the identified user will interact with the contact upon seeing the contact listed in the activity unit.

The unified scoring model determines a feature set containing features representing active now features, ephemeral content features, shared features, and other features. The unified scoring model additionally determines binary modifiers for active now and ephemeral features.

$$\text{feature set} = [\mathbb{1}_A, \mathbb{1}_D, [\text{shared}][\text{active}][\text{ephemeral}] \ldots ]$$ Equation 1

As one example shown in Equation 1, the feature set used by the unified scoring model uses the active now modifier $\mathbb{1}_A$, the ephemeral content modifier $\mathbb{1}_D$, and sets of vectors respectively representing features relevant to both active now and ephemeral content information [shared], features relevant to active now information [active], and features relevant to ephemeral content information [ephemeral]. The active now modifier $\mathbb{1}_A$ and the ephemeral content modifier $\mathbb{1}_D$ are 1 if the contact is active now and/or has available ephemeral content respectively, or 0 if the contact is not active now and/or does not have available ephemeral content respectively. In one embodiment, the feature set additionally contains one or more vectors representing other features used to generate a score for the input contact. For example, additional vector sets may be used to represent demographic or biographic information associated with the user and/or the contact on the contact list. Based on the feature set vector and the modifiers, the unified scoring model generates a score for the input contact of the contact list.

In one embodiment, the scoring model is a gradient boosted decision tree (GBDT) model. In different embodiments, the contact score module 310 may use different types of models. The contact score module 310 stores the trained scoring model. The contact score module 310 uses the scoring model to generate scores for contacts in contact lists and transmits the scores to a ranking module 315. In one embodiment, the contact score module 310 updates and transmits the generated scores for contacts in contact lists at set time intervals. In another embodiment, the contact score module 310 updates the generated scores when the user of the messaging application 112 transmits a request to display the contact list (e.g., by navigating to or refreshing a screen of the messaging application displaying the activity unit).

The ranking module 315 ranks the contacts in a contact list based at least in part on the scores generated by the contact score module 310 to form a ranked contact list. In one embodiment, the ranking module 315 ranks the contacts in descending order of scores, such that the higher-scored contacts are ranked higher. Contacts with scores of zero may be ranked below the contacts with scores or excluded from the ranked list. In one embodiment, the ranking module 315 updates the ranked contact list on a periodic basis as the scores change. For example, the ranking module 315 updates the ranked contact list each time the contact score module 310 updates and transmits scores.

The list delivery module 320 receives ranked contact lists from the ranking module 315 and forwards the ranked contact lists to the messaging application 112 of the appropriate client devices 110. The list delivery module 320 receives a request from a user's messaging application 112 for a ranked contact list for the user. In response, the list delivery module 320 provides the ranked contact list to the messaging application 112. In some embodiments, the list delivery module 320 provides only a subset of the contact list to the messaging application 112. For example, the list delivery module 320 may provide only contacts on the ranked contact list that exceed a score threshold. In another example, the list delivery module 320 may provide a ranked contact list containing a threshold number of contacts with the highest scores (e.g., the highest 100 scores).

Figure 4:
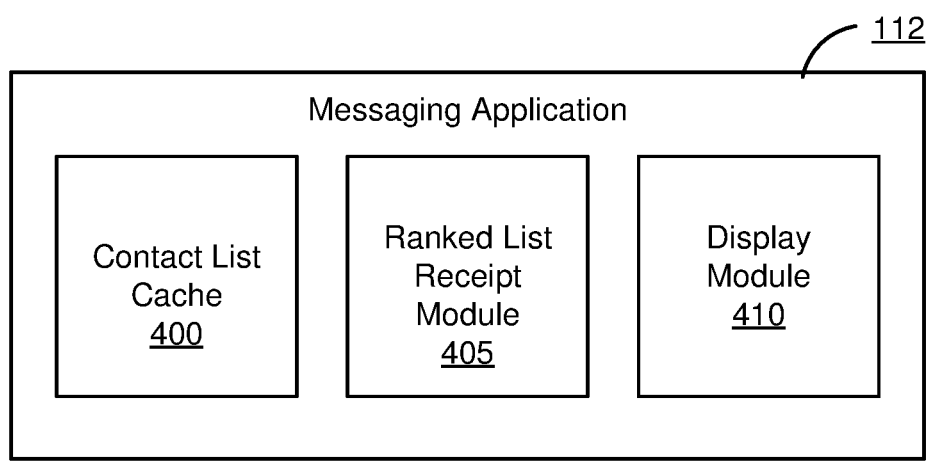
FIG. 4 is a block diagram of an architecture of the client messaging application, in accordance with an embodiment.

FIG. 4 is a block diagram of an architecture of the messaging application 112 according to one embodiment. The messaging application 112 shown in FIG. 4 includes a contact list cache 400, a ranked list receipt module 405, and a display module 410. In other embodiments, the messaging application 112 may include additional, fewer, or different modules. In addition, the functionality attributed to specific modules herein may be performed by other modules in other embodiments.

The contact list cache 400 stores one or more contact lists for a user of the messaging application 112. The contact list may be derived from information entered manually by the user, from information stored on the client device 110, and/or from information stored by the online system 120. For example, the contact list may be formed of phone and/or email contacts imported from data stored on the client device 110. In another example, the contact list may be formed by retrieving information about connections associated with the user from the online system 120.

For each contact, the contact list cache 400 stores identifying information, such as a name, a phone number, and/or an identifier used by the messaging system 130. The contact list cache 400 shares the contact list with the messaging system 130. In one embodiment, the contact list cache 400 transmits the contact list to the messaging system 130 when the messaging application 112 is first accessed by the user, and then sends delta updates to the messaging system 130 as the list changes over time. In one embodiment, the messaging application 112 uses information in the contact list to gather demographic and biographic information and associated content from the online system 120.

The ranked list receipt module 405 receives a ranked contact list from the messaging system 130. The ranked contact list includes contacts in the contact list for the user of the messaging application 112 that are active now and/or have available ephemeral content. In one embodiment, the ranked list receipt module 405 receives delta updates from the messaging system 130 as the active now information, ephemeral content, and/or scores associated with contacts in the contact list change.

The display module 410 displays ranked contact lists to the user of the messaging application 112. In one embodiment, the display module 410 displays the contact list in the activity unit described above with respect to FIG. 1. In some embodiments, the display module 410 displays each contact in association with an icon representing the contact and the type of interaction available with the contact. Different icons may be used by the display module 410 to represent different types of interactions available with the contact and/or different information about the contact. For example, a first icon may be used to represent that a contact is active now while a second icon is used to represent that ephemeral content is available for the contact. The display module 410 updates the displayed contact list as the ephemeral content, active now information, and/or the scores associated with contacts in the contact list change.

Figure 5:
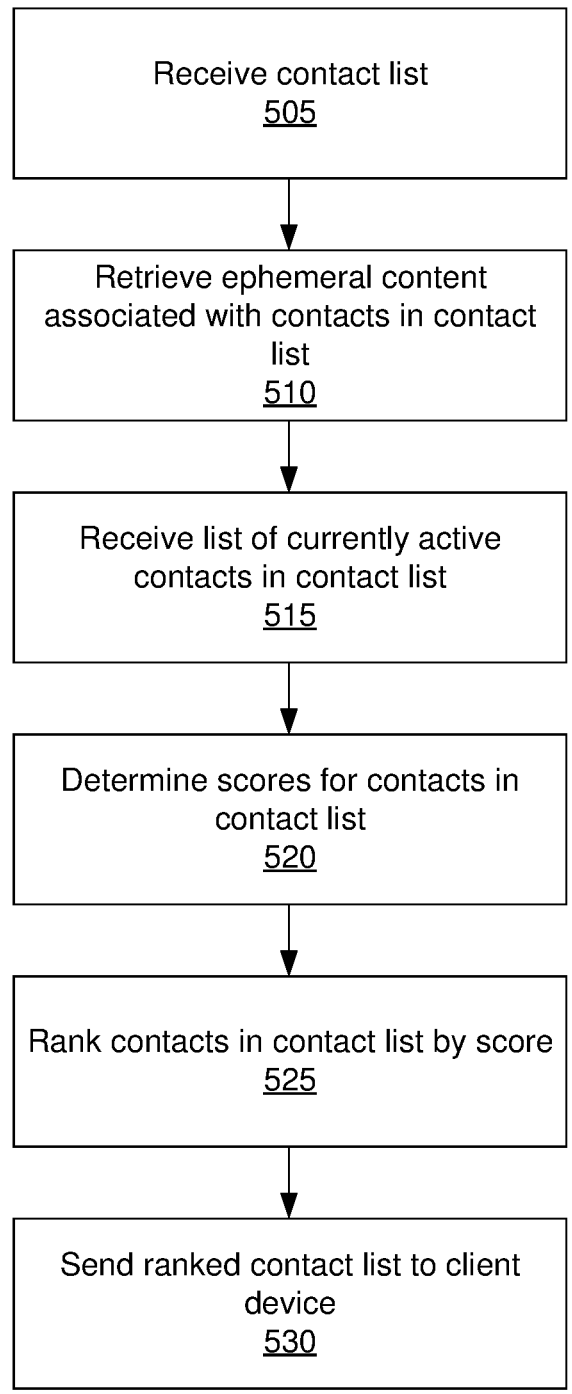
FIG. 5 is a flow chart illustrating a method of organizing contacts in a contact list based on a combined model for active now contacts and contacts with associated ephemeral content, in accordance with an embodiment.

FIG. 5 is a flow chart illustrating a method of organizing contacts in a contact list based on a combined model for active now contacts and contacts with associated ephemeral content according to one embodiment. The steps of FIG. 5 may be performed by the messaging system 130. Some or all of the steps may be performed by other entities in other embodiments. In addition, other embodiments may include different and/or additional steps, and the steps may be performed in different orders.

The messaging system 130 receives 505 a contact list to be scored and ranked for a given user of a messaging application 112 from a client device 110. The messaging system 130 retrieves 510 information indicating whether ephemeral content associated with the contacts in the contact list is available from the content store 205 of the online system 120 and receives 515 a list of currently active contacts in the contact list from the active now service 140. Based on the available ephemeral content and the list of currently active contacts, the messaging system 130 determines 520 scores for the contacts in the contact list using a unified scoring model. The messaging system 130 then ranks 525 contacts in the contact list, the ranking based at least in part on the determined scores for the contacts. The messaging system 130 then sends 530 the ranked contact list to the client device 110.

Figure 6:
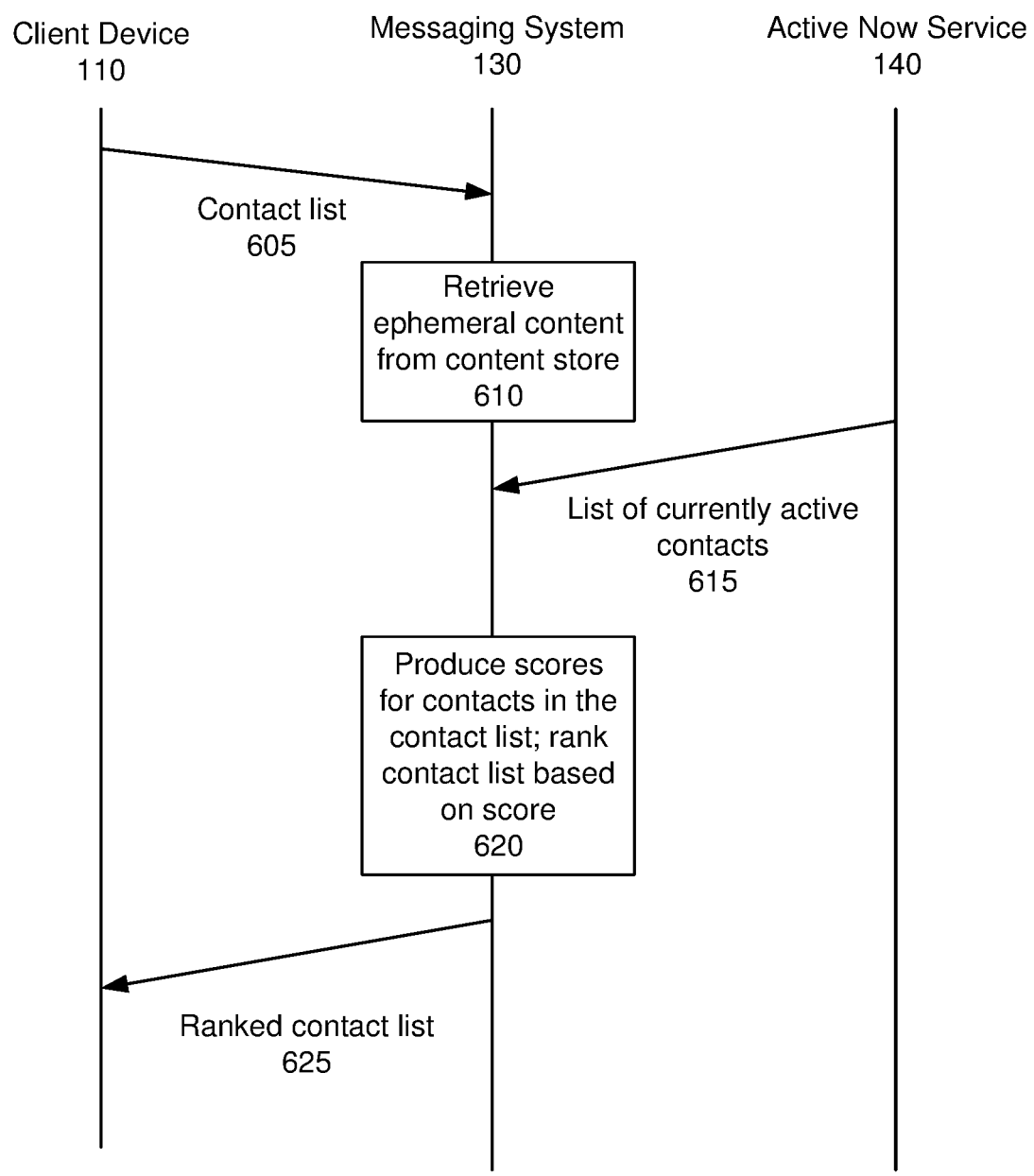
FIG. 6 is a transaction diagram illustrating interactions between a client device, messaging system, and active now service, in accordance with an embodiment.

FIG. 6 is a transaction diagram illustrating interactions between a client device 110, a messaging system 130, and active now service 140, in accordance with an embodiment. The client device 110 transmits a contact list 605 to the messaging system 130. Based on the contacts in the contact list, the messaging system 130 retrieves information about available ephemeral content from the content store 610. In addition, the active now service 140 transmits a list of currently active contacts 615 to the messaging system 130. Based on the available ephemeral content and the list of currently active contacts, the messaging system 130 produces scores for contacts in the contact list using a unified model and ranks the contact list based on the produced scores 620. The messaging system 130 then transmits the ranked contact list 625 to the client device 110, where it may be displayed to a viewing user within an activity unit.

Figure 7:
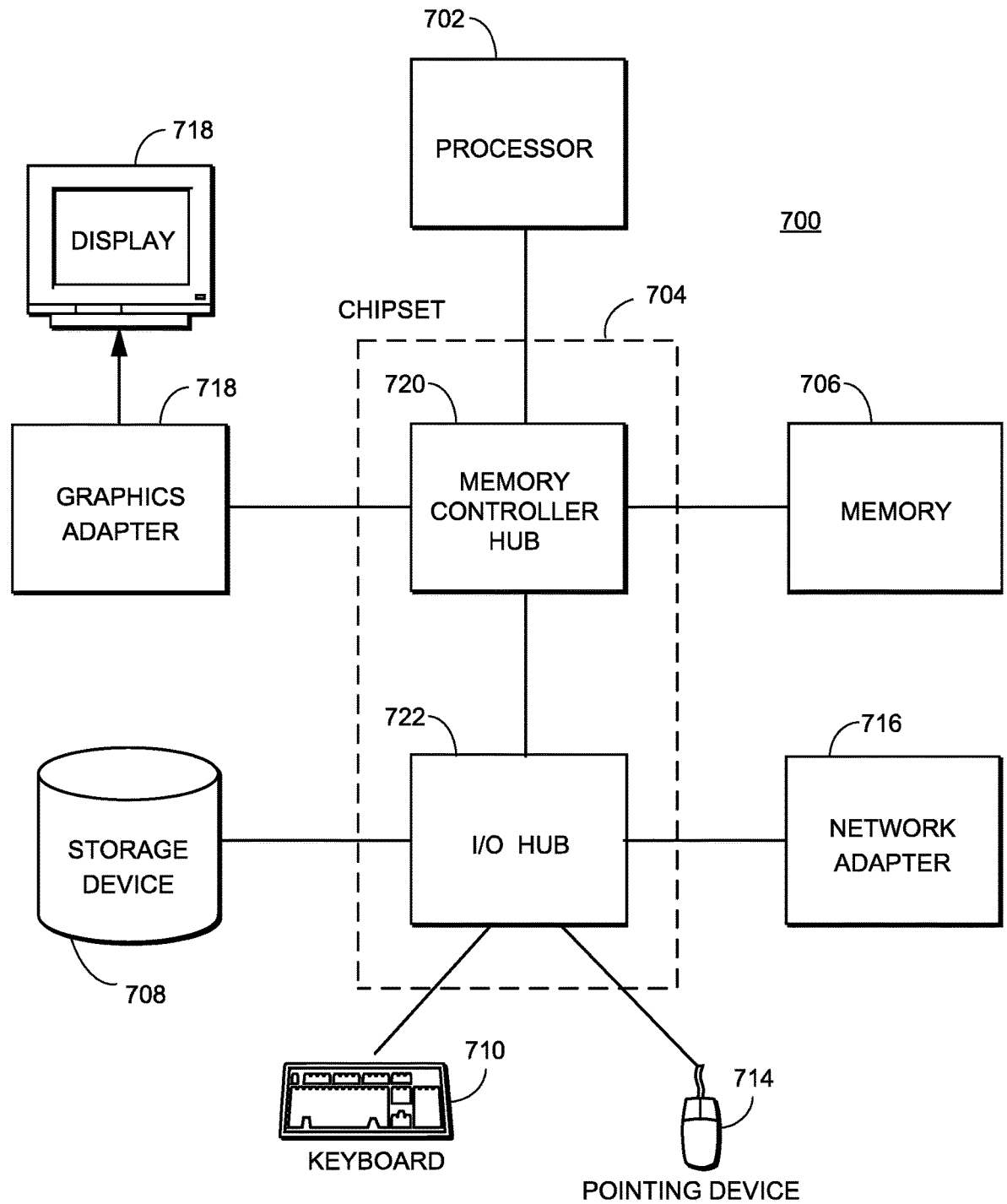
FIG. 7 is a high-level block diagram illustrating physical components of a computer used as part or all of one or more of the entities described herein in one embodiment.

FIG. 7 is a high-level block diagram illustrating physical components of a computer 700 used as part or all of one or more of the entities described herein in one embodiment. For example, instances of the illustrated computer 700 may be used as a server operating the messaging system 130. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In one embodiment, one or more sound devices (e.g., a loudspeaker, audio driver, etc.) is coupled to chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer 700. The graphics adapter 712 displays images and other information on the display 718. The network adapter 716 couples the computer system 700 to a local or wide area network.

As is known in the art, a computer 700 can have different and/or other components than those shown in FIG. 7. In addition, the computer 700 can lack certain illustrated components. In one embodiment, a computer 700 acting as a server may lack a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a contact list from a client device used by a user via a network, the contact list including contact information identifying contacts of the user in an online system;
receiving information about ephemeral content associated with contacts in the contact list, the ephemeral content posted by contacts in the contact list to the online system;
receiving information about which contacts in the contact list are currently using the online system;
determining scores for contacts in the contact list by applying a machine-learned model to the received information about ephemeral content and the received information about which contacts are currently using the online system, the machine-learned model outputting a score representing a likelihood that the user will interact with a contact in the contact list upon seeing the contact presented in an activity unit shown by the client device;
ranking the contacts in the contact list based at least in part on the determined scores; and
sending the ranked contact list to the client device.

2. The method of claim 1, wherein the machined-learned model is a unified model trained using a plurality of data sets, different data sets containing different types of data having different features.

3. The method of claim 1, further comprising:
collecting a training dataset, the training dataset including examples describing observed user interactions with ephemeral content and contacts that are currently using the online system;
extracting features from the examples of the training dataset features, the features relevant to likelihoods that the user will interact with a contact upon being presented with an indication that the contact is currently using the online system and/or has associated ephemeral content; and
training the machine-learned model using the features of the training dataset.

4. The method of claim 1, wherein the machine-learned model determines the score responsive to a feature set comprising an active now modifier indicating whether the contact is currently using the online system and an ephemeral content modifier indicating whether the contact has available ephemeral content.

5. The method of claim 1, wherein the machine-learned model selectively boosts a score associated with the contact to promote a particular interaction.

6. The method of claim 1, wherein the client device is adapted to present the ranked contact list to the user an activity unit, the activity unit using different icons to represent different types of available interactions with the contacts.

7. A non-transitory computer-readable storage medium storing computer program instructions executable by a processor to perform operations comprising:
receiving a contact list from a client device used by a user via a network, the contact list including contact information identifying contacts of the user in an online system;
receiving information about ephemeral content associated with contacts in the contact list, the ephemeral content posted by contacts in the contact list to the online system;
receiving information about which contacts in the contact list are currently using the online system;
determining scores for contacts in the contact list by applying a machine-learned model to the received information about ephemeral content and the received information about which contacts are currently using the online system, the machine-learned model outputting a score representing a likelihood that the user will interact with a contact in the contact list upon seeing the contact presented in an activity unit shown by the client device;
ranking the contacts in the contact list based at least in part on the determined scores; and
sending the ranked contact list to the client device.

8. The computer-readable storage medium of claim 7, wherein the machined-learned model is a unified model trained using a plurality of data sets, different data sets containing different types of data having different features.

9. The computer-readable storage medium of claim 7, further comprising:
collecting a training dataset, the training dataset including examples describing observed user interactions with ephemeral content and contacts that are currently using the online system;
extracting features from the examples of the training dataset features, the features relevant to likelihoods that the user will interact with a contact upon being presented with an indication that the contact is currently using the online system and/or has associated ephemeral content; and
training the machine-learned model using the features of the training dataset.

10. The computer-readable storage medium of claim 7, wherein the machine-learned model determines the score responsive to a feature set comprising an active now modifier indicating whether the contact is currently using the online system and an ephemeral content modifier indicating whether the contact has available ephemeral content.

11. The computer-readable storage medium of claim 7, wherein the machine-learned model selectively boosts a score associated with the contact to promote a particular interaction.

12. The computer-readable storage medium of claim 7, wherein the client device is adapted to present the ranked contact list to the user an activity unit, the activity unit using different icons to represent different types of available interactions with the contacts.

13. A system comprising:
a computer processor for executing computer program instructions; and
a non-transitory computer-readable storage medium storing computer program instructions executable by the processor to perform operations comprising:
receiving a contact list from a client device used by a user via a network, the contact list including contact information identifying contacts of the user in an online system;
receiving information about ephemeral content associated with contacts in the contact list, the ephemeral content posted by contacts in the contact list to the online system;
receiving information about which contacts in the contact list are currently using the online system;

determining scores for contacts in the contact list by applying a machine-learned model to the received information about ephemeral content and the received information about which contacts are currently using the online system, the machine-learned model outputting a score representing a likelihood that the user will interact with a contact in the contact list upon seeing the contact presented in an activity unit shown by the client device;

ranking the contacts in the contact list based at least in part on the determined scores; and sending the ranked contact list to the client device.

14. The system of claim 13, wherein the machined-learned model is a unified model trained using a plurality of data sets, different data sets containing different types of data having different features.

15. The system of claim 13, further comprising:

collecting a training dataset, the training dataset including examples describing observed user interactions with ephemeral content and contacts that are currently using the online system;

extracting features from the examples of the training dataset features, the features relevant to likelihoods that the user will interact with a contact upon being presented with an indication that the contact is currently using the online system and/or has associated ephemeral content; and training the machine-learned model using the features of the training dataset.

16. The system of claim 13, wherein the machine-learned model determines the score responsive to a feature set comprising an active now modifier indicating whether the contact is currently using the online system and an ephemeral content modifier indicating whether the contact has available ephemeral content.

17. The system of claim 13, wherein the machine-learned model selectively boosts a score associated with the contact to promote a particular interaction.

* * * * *

UNITED STATES PATENT AND TRADEMARK OFFICE
CERTIFICATE OF CORRECTION

PATENT NO.         : 10,812,437 B1
APPLICATION NO.    : 15/943639
DATED              : October 20, 2020
INVENTOR(S)        : Liu et al.

Page 1 of 1

It is certified that error appears in the above-identified patent and that said Letters Patent is hereby corrected as shown below:

In the Claims

In Column 16, Claim 8, Line 19, delete "The computer-readable storage medium" and insert -- The non-transitory computer-readable storage medium --, therefor.

In Column 16, Claim 9, Line 23, delete "The computer-readable storage medium" and insert -- The non-transitory computer-readable storage medium --, therefor.

In Column 16, Claim 10, Line 37, delete "The computer-readable storage medium" and insert -- The non-transitory computer-readable storage medium --, therefor.

In Column 16, Claim 11, Line 43, delete "The computer-readable storage medium" and insert -- The non-transitory computer-readable storage medium --, therefor.

In Column 16, Claim 12, Line 47, delete "The computer-readable storage medium" and insert -- The non-transitory computer-readable storage medium --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*